United States Patent
Botes et al.

(10) Patent No.: US 7,655,704 B2
(45) Date of Patent: *Feb. 2, 2010

(54) HYDROCARBON SYNTHESIS PROCESS USING AN ALKALI PROMOTED IRON CATALYST

(75) Inventors: Frederick Gideon Botes, Vanderbijlpark (ZA); Tracy Carolyn Bromfield, Vanderbijlpark (ZA)

(73) Assignee: Sasol Technology (Proprietary) Ltd., Johannesburg (ZA)

( * ) Notice: Subject to any disclaimer, the term of this patent is extended or adjusted under 35 U.S.C. 154(b) by 0 days.

This patent is subject to a terminal disclaimer.

(21) Appl. No.: 10/510,836

(22) PCT Filed: Apr. 15, 2003

(86) PCT No.: PCT/ZA03/00051

§ 371 (c)(1),
(2), (4) Date: May 17, 2005

(87) PCT Pub. No.: WO03/087265

PCT Pub. Date: Oct. 23, 2003

(65) Prior Publication Data

US 2005/0203194 A1    Sep. 15, 2005

Related U.S. Application Data

(60) Provisional application No. 60/372,667, filed on Apr. 16, 2002.

(30) Foreign Application Priority Data

Apr. 16, 2002  (ZA)  ................................. 2002/2986

(51) Int. Cl.
C07C 27/00    (2006.01)
(52) U.S. Cl. ....................... 518/719; 518/700; 518/715; 518/721
(58) Field of Classification Search ................. 518/717, 518/719, 721, 700, 715
See application file for complete search history.

(56) References Cited

U.S. PATENT DOCUMENTS

| | | | |
|---|---|---|---|
| 4,086,262 A | 4/1978 | Chang et al. | |
| 4,172,843 A | 10/1979 | Dwyer et al. | |
| 4,269,783 A | 5/1981 | Brennan et al. | |
| 4,279,830 A | 7/1981 | Haag et al. | |
| 4,289,695 A | 9/1981 | Chou | |
| 4,298,695 A | 11/1981 | Butter et al. | |
| 4,304,871 A | 12/1981 | Brennan et al. | |
| 4,361,503 A | 11/1982 | Dwyer et al. | |
| 4,463,101 A | 7/1984 | Dwyer et al. | |
| 4,556,645 A | 12/1985 | Coughlin et al. | |
| 4,652,538 A | 3/1987 | Rabo et al. | |
| 4,978,689 A * | 12/1990 | Bell et al. | ................... 518/709 |
| 4,994,428 A * | 2/1991 | Bell et al. | ................... 502/330 |
| 7,459,485 B2 | 12/2008 | Botes et al. | |
| 2003/0120118 A1 | 6/2003 | Betts et al. | |

FOREIGN PATENT DOCUMENTS

| | | |
|---|---|---|
| GB | 672405 | 5/1952 |
| GB | 2 247 412 A | 3/1992 |
| WO | WO 01/97968 A2 | 12/2001 |

OTHER PUBLICATIONS

Office Action of Nov. 1, 2007 in U.S. Appl. No. 10/511,390.

* cited by examiner

*Primary Examiner*—Jafar Parsa
(74) *Attorney, Agent, or Firm*—Finnegan, Henderson, Farabow, Garrett & Dunner, L.L.P.

(57) ABSTRACT

This invention relates to a high temperature Fischer-Tropsch (HTFT) hydrocarbon synthesis process comprising the conversion of a feed of $H_2$ and at least one carbon oxide to hydrocarbons containing at least 30% on a mass basis hydrocarbons with five or more carbon atoms (hereinafter referred to as $C_{5+}$ compounds). The conversion is carried out in the presence of an alkali-promoted iron hydrocarbon synthesis catalyst, and the process is characterised therein that the reaction mixture formed during the conversion contains less than 0.02 mol alkali per 100 g iron, and that the $H_2$:carbon oxide molar ratio in the feed of $H_2$ and carbon oxide is at least 2.

10 Claims, No Drawings

HYDROCARBON SYNTHESIS PROCESS USING AN ALKALI PROMOTED IRON CATALYST

CROSS REFERENCE TO RELATED APPLICATIONS

This application is a national phase application based on PCT/ZA03/00051, filed Apr. 15, 2003, and claims the priority of South African Patent Application No. 2002/2986, filed Apr. 16, 2002, and the benefit of U.S. Provisional Application No. 60/372,667, filed on Apr. 16, 2002, the content of all of which is incorporated herein by reference.

TECHNICAL FIELD

This invention relates to a hydrocarbon synthesis process and more particularly to such a process wherein a hydrocarbon synthesis catalyst is used. The process is particularly suitable for producing hydrocarbons containing at least 30% on a mass basis hydrocarbons with five or more carbon atoms ($C_{5+}$ compounds).

BACKGROUND ART

Fischer-Tropsch processes for hydrocarbon synthesis from CO and $H_2$ (syngas) are known to produce gaseous and liquid hydrocarbons as well as oxygenates which, in general, follow the well-known Anderson-Schulz-Flory product distribution.

These reactions can be carried out in fixed, fluidised or slurry bed reactors. The production of olefins and liquid fuels, especially in the gasoline range products, is most favoured by synthesis carried out in a two-phase fluidised bed reactor operating at 350° C. and 20 bar or higher pressures and usually utilising a fused alkali promoted iron catalyst. This is known as a high temperature Fischer-Tropsch (HTFT) process.

In terms of the ideal Anderson-Schulz-Flory product distribution it is clear that the $C_{5+}$ selectivity has a maximum value of around 65%. In a commercial high temperature Fischer-Tropsch process performed in a fluidised bed reactor, the optimum $C_{5+}$ compound yield is usually not realised, thus resulting in a much lower $C_{5+}$ compound selectivity. The reason for this is that at optimum conditions for the production of maximum $C_{5+}$ compounds the process is negatively influenced by other factors, one important factor being the formation of elemental carbon. The disadvantage is that the elemental carbon is deposited on the iron catalyst which causes swelling and disintegration of the particles. This powdering of the catalyst particles results in the plugging of fixed bed catalyst reactors. In a fluidised bed the fines which are produced as a result of catalyst disintegration have a high carbon content and hence have a low particle density. Because of this the fines are readily carried out of the reactors by effluent gas and will foul the downstream equipment and also the heavy oil products. Due to the swelling of the individual particles, the entire fluidised catalyst bed expands which negatively influences the reaction.

In order to reduce carbon formation one can reduce the levels of alkali promoter for the iron catalyst and one can also increase the $H_2$:CO ratio in the syngas to be converted to hydrocarbons.

However, it is known that iron based Fischer-Tropsch catalysts with a low alkaline promoter level tend to produce light hydrocarbons and are also not easily converted to the $C_{5+}$ compound range. That is, it has been found that a HTFT process with less than 0.02 mol alkali metal promoter per 100 g iron (even if a $H_2$:carbon oxide ratio of less than 2 is used) favours products in the $C_1$ to $C_4$ compound range as have been published in Catalysis Science and Technology, Volume 1, 1981, pages 202-209 and WO 0197968.

The situation is accordingly that if conditions are selected (either a low alkali level or a high $H_2$:CO ratio) to reduce formation of elemental carbon, it is expected that hydrocarbon products in the $C_1$ to $C_4$ range will be favoured, thus a synthesis hydrocarbon product with less than 30% by weight of $C_{5+}$ product will form.

It has now been found that if hydrocarbon synthesis of syngas is carried out in the presence of a hydrocarbon synthesis catalyst under both the conditions where:
i) the hydrocarbon synthesis catalyst includes a low level of alkali metal; and
ii) the hydrogen to carbon monoxide ratio of the syngas feed stream is relatively high, formation of free elemental carbon is reduced. However it has most surprisingly been found that the use of these conditions did not result in the formation of an extremely light hydrocarbon product, (as would be expected) but unexpectedly resulted in the synthesis of hydrocarbons containing at least 30% on a mass basis $C_{5+}$ compounds.

DISCLOSURE OF THE INVENTION

According to the present invention there is provided a high temperature Fischer-Tropsch (HTFT) hydrocarbon synthesis process comprising the conversion of a feed of $H_2$ and at least one carbon oxide to hydrocarbons containing at least 30% on a mass basis hydrocarbons with five or more carbon atoms (hereinafter referred to as $C_{5+}$ compounds), the conversion being carried out in the presence of an alkali-promoted iron hydrocarbon sythesis catalyst; and the process being characterised therein that the reaction mixture formed during the conversion contains less than 0.02 mol alkali metal per 100 g iron; and that the $H_2$:carbon oxide molar ratio in the feed of $H_2$ and carbon oxide is at least 2.

The synthesised hydrocarbons preferably contain, on a mass basis, at least 35%, more preferably at least 40% and most preferably at least 45%, $C_5^+$ compounds.

The temperature range for the HTFT hydrocarbon process may be between 280° C. and 400° C., preferably above 300° C., typically from 300° C. to 370° C., and even from 330° C. to 350° C. The pressure may be from 10 to 60 bar (1 to 6 MPa), typically from 15 to 30 bar, and usually at about 20 bar.

The at least one carbon oxide in the syngas preferably comprises CO. The carbon oxide may comprise a mixture of CO and $CO_2$.

The reaction may be carried out in any suitable reactor. It is foreseen that preferably it will be carried out in a fluidised bed reactor, preferably in a fixed fluidised bed reactor.

The hydrocarbon synthesis catalyst may comprise any suitable alkali-promoted iron Fischer-Tropsch catalyst. The iron catalyst preferably comprises a precipitated iron catalyst, but it may also comprise a fused iron catalyst. If the process is to be performed in a fluidised bed reactor, the final catalyst may be produced by means of a variety of known methods in order to obtain particles with acceptable fluidisation properties, such as crushing, spray-drying, etc. In order to obtain a particle size distribution suitable for fluidisation, the catalyst may be classified by means of known methods, such as sieving, cyclone classification, etc.

The precipitated catalyst preferably comprises a precipitated catalyst as described in WO 01/97968 A2 which is incorporated herein by reference.

The iron catalyst contains at least one alkali promoter usually in the form of an alkali oxide. The alkali promoter preferably comprises potassium oxide or sodium oxide. The catalyst may contain more than one alkali promoter. The alkali can be added to the iron by means of various methods, such as impregnation of the iron with the alkali, co-precipitating the alkali with the iron, fusing the iron and the alkali, etc.

The total alkali metal content (mol alkali metal per 100 g iron) must preferably be below 0.02, more preferably below 0.01, and most preferably below 0.005. Preferably the total of alkali metal is contained in the iron catalyst.

The iron catalyst may also contain other promoters. Certain promoters, for example Al, Tl, Cr, Mg, Mn and Ca can be added as structural promoters to the iron catalyst. Binders, such as silica or alumina, may also be added in case of a spray-dried catalyst.

The $H_2$ and carbon feed is known as synthesis feed gas (or syngas) and it may also include other components, such as water vapour, Ar, $CH_4$, light hydrocarbons, etc.

The $H_2$:carbon oxide molar ratio may be as low as possible at or above the ratio of 2. However it may be higher e.g. 2.1 and even as high as 2.2 and 2.6 and it is believed even higher.

The invention also relates to hydrocarbons produced by the process substantially as described hereinabove.

The invention will now be further described by means of the following non-limiting examples.

EXAMPLES 1

Catalysts

Precipitated iron catalysts (A, B and C referred to in Table 2) containing low levels of alkali were employed as syngas ($H_2$ and carbon oxide) conversion catalysts. These catalysts were prepared by adding a 1M aqueous solution of Fe $(NO_3)_3.9H_2O$ to a 25% (w/w) aqueous solution of ammonium hydroxide ($NH_4OH$) at ambient temperature while stirring rapidly to maintain a constant pH of 7.5 containing the relevant promoters. The resulting precipitate was filtered and dried at 120° C. for 16 hours. The dried product was then heat treated to 350° C. in a rotary retort furnace for 4 hours and after drying sieved between 38 μm-150 μm.

A fused catalyst D was prepared by adding the relevant promoters in the form of $K_2O$ and $Na_2O$ to oxidised mill-scale to obtain a dry mixture of the precursor material. This mixture was then fused in an electric arc furnace at a temperature of about 1650° C. The molten material was cast as ingots. After cooling, the ingots were crushed, milled and then sieved to obtain a particle size fraction of 38 to 150 micron.

Reactor System

A Berty microreactor was used. The catalyst inside a Berty microreactor is contained in a very thin bed. A fan, situated below this bed, circulates gas through the catalyst at a high rate. The reactor can therefore essentially be viewed as a short packed bed with an extremely high recycle ratio, and thus behaves approximately like a continuous stirred tank reactor (CSTR). Since the gas circulation through the catalyst ensures that there are no significant temperature or concentration profiles across the bed, this reactor is ideal for studying the highly exothermic high temperature Fischer-Tropsch (HTFT) reaction. It will be appreciated that the Berty microreactor is considered as a very good simulation of a fluidised bed reactor.

The main component of the Berty reactor feed during the examples was a commercial synthesis gas stream. Pure hydrogen and carbon dioxide were co-fed from bottles in order to obtain a total syngas feed to the Berty reactor that was rich in hydrogen. In addition, bottled argon was fed to the reactor, which served as an internal standard. The flow rates of the four feed streams were controlled by Brooks mass flow controllers. The composition of the total Berty feed for catalyst D of Table 2 is presented in Table 1. For catalysts A, B and C the feed was very similar but the $H_2$:($CO+CO_2$) ratio was varied as shown in Table 2.

TABLE 1

Feed stream composition of Berty reactor experiments (molar %)

| Component | molar % |
| --- | --- |
| $H_2$ | 58 |
| CO | 12.5 |
| $CO_2$ | 12 |
| $CH_4$ | 5.5 |
| Ar | 12 |

The effluent from the Berty reactor was passed through a two-stage knock-out system. In the first pot (hot knock-out pot), waxy hydrocarbons were condensed. The amount of product drained from this pot, if any, was negligible. A second pot (cold knock-out pot) condensed the condensable hydrocarbons and reaction water, while the uncondensed effluent flowed to a vent system. The product sampling point was situated before the cold knock-out pot to ensure that a sample was taken of the comprehensive product spectrum. Samples were taken in glass ampoules for later GC analysis. The hydrocarbon product spectrum was characterised by means of a GC-FID analysis.

Loading of the Reactor

In each case 5 g of the iron catalyst (unreduced weight) was loaded in the reactor.

Catalyst Activation And Synthesis

Each iron catalyst was reduced with a hydrogen feed of 1000 ml/min for 16 hours at a temperature of 420° C. prior to synthesis. Thereafter, the temperature was lowered to 330° C. under a combined feed of argon and hydrogen. After the temperature had stabilised, synthesis commenced by setting all the mass flow controllers to the desired values in order to obtain the total feed composition (presented in Table 1 for catalyst D) at a total flow rate of 1500 ml/min. During reduction and synthesis, the total reactor pressure was maintained at 20 bar.

Results

The results of the experiments are presented in Table 2.

TABLE 2

Results

| | \multicolumn{4}{c}{Experiment} | | | |
|---|---|---|---|---|
| | HTFT run | HTFT run | HTFT run | HTFT run |
| | \multicolumn{4}{c}{Catalyst(s)} | | | |
| | Iron catalyst A 0.002 mol K/100 g Fe | Iron catalyst B 0.006 mol Na/100 g Fe | Iron catalyst C 0.005 mol K + Na/100 g Fe | Iron Catalyst D 0.0177 mol K + Na/100 g Fe |
| Time on line [h] | 48 | 48 | 24 | 22 |
| ($H_2$ + CO) conversion [mol %] | 46.3 | 46.3 | 46.3 | 46.3 |
| GHSV | 12 | 12 | 12 | 12 |
| $H_2/(CO + CO_2)$ [mol/mol] | 2.2 | 2.6 | 2.2 | 2.37 |
| $(CO + CO_2)$ conversion [mol %] | 42 | 42 | 49 | 89.7 |
| Hydrocarbon product distribution [mass %] | | | | |
| $C_1$ | 15 | 17 | 8 | 11.6 |
| $C_2$ | 14 | 12 | 13 | 10.9 |
| $C_3$ | 17 | 16 | 16 | 16.8 |
| $C_4$ | 14 | 13 | 15 | 12.8 |
| $C_5$ | 39 | 42 | 47 | 47.9 |

Catalyst C contained 0.002 mol K and 0.003 mol Na and catalyst D contained 0.0064 mol K and 0.0113 mol Na.

From the results it is clear that the process according to the invention produced a substantial amount of condensable hydrocarbons, even though the syngas feed to the reactor was rich in hydrogen and the alkali metal content of the iron catalyst was low. The $C_5^+$ selectivity was well above 35%. The precipitated catalysts gave very good selectivities at very low alkali metal levels compared to that of the fused iron catalyst.

EXAMPLES 2

Catalysts

Fused iron catalysts (DD, E and F) containing low levels of alkali metal were employed as syngas ($H_2$ and carbon oxide) conversion catalysts. The catalysts were prepared by adding the relevant promoters (in the form of $K_2O$ and/or $Na_2O$) to oxidised mill-scale to obtain a dry mixture of the precursor material. This mixture was then fused in an electric arc furnace at a temperature of about 1650° C. The molten material was cast as ingots. After cooling, the ingots were crushed to a particle size of between 10 µm-125 µm. K was used as a promoter for catalysts DD, E and F.

Precipitated iron catalyst G containing K as promoter was also employed as a syngas ($H_2$ and carbon oxide) conversion catalysts. The catalyst was prepared by adding a 1M aqueous solution of $Fe(NO_3)_3 \cdot 9H_2O$ to a 25% (w/w) aqueous solution of ammonium hydroxide ($NH_4OH$) at ambient temperature while stirring rapidly to maintain a constant pH of 7.5 containing the relevant promoter. The resulting precipitate was filtered using a filter press, and washed with distilled water to a conductivity of 60 µS in the wash water effluent stream. After briefly drying with a nitrogen stream, the product was then homogenized with water to achieve a slurry with a solids content suitable for spray-drying. The slurry was spray-dried using a hollow cone nozzle at a pressure of 15 bar, inlet temperature of 350° C. and an outlet temperature of 115° C. to achieve a particle size distribution of between 10 µm -125 µm. The dried product was then heat treated to 350° C. in a rotary retort furnace for 4 hours.

Reactor System

Catalysts DD, E, F and G were reduced in a fluidised bed reactor under pure hydrogen at 380° C. for 16 hours at 17 bar with a gas hour space velocity (GHSV) of 54390 (1/h). The synthesis gas was introduced in the reactor. The HTFT synthesis was carried out at 19 bar, with an inlet gas temperature of 325° C. while the reaction zone temperature was held at 330° C. Decanted oil was knocked out form the exit gas and the overhead stream was condensed in a high-pressure vessel. The product stream was then directed to a low pressure vessel were light oil and water were recovered. Samples were taken from the tailgas for later GC analysis. The hydrocarbon product spectrum was characterised by means of a GC-FID analysis. The results are presented in Table 3.

TABLE 3

Results

| | \multicolumn{4}{c}{Catalyst} | | | |
|---|---|---|---|---|
| | Fused Catalyst DD | Fused Catalyst E | Fused Catalyst F | Precipitated Catalyst G |
| Alkali metal level (mol/100 g Fe) | 0.023 | 0.022 | 0.006 | 0.008 |
| Temperature (OC) | 330 | 330 | 330 | 328 |
| Pressure (bar) | 19 | 20 | 20 | 19 |

TABLE 3-continued

Results

| | Catalyst | | | |
|---|---|---|---|---|
| | Fused Catalyst DD | Fused Catalyst E | Fused Catalyst F | Precipitated Catalyst G |
| $pH2^{0.5}/(pCO + pCO2)$* | 1.3 | 0.93 | 0.87 | 1.3 |
| C Total/100 g Fe/day | 9.4 | n/a | <3 | 3.3 |
| C free/100 g Fe/day | 7 | 7 | too low to measure | 2 |
| $C_{5+}$ selectivity (mass/mass) | 49 | 49 | 26 | 47 |

*$pH2^{0.5}/(pCO + pCO_2)$ refers to the partial pressures of $H_2$, CO and $CO_2$ in the total feed to the reactor. In each case the $H_2$: carbon oxide molar ratio was greater than 2.

From the results it can be seen that in each case there was very low carbon formation.

At low alkali metal levels (0.006 mol alkali metal/100 g Fe) the precipitated catalyst gave a very good $C_{5+}$ compound selectivity compared to the fused catalyst.

The invention claimed is:

1. A high temperature Fischer-Tropsch (HTFT) hydrocarbon synthesis process comprising converting a feed of $H_2$ and carbon oxide, said carbon oxide including at least carbon monoxide and carbon dioxide, under high temperature Fischer-Tropsch (HTFT) hydrocarbon synthesis conditions to hydrocarbons containing at least 30% on a mass basis of hydrocarbons with five or more carbon atoms ($C_{5+}$ compounds) in the presence of an alkali-promoted iron hydrocarbon synthesis catalyst, wherein a reaction mixture formed during the conversion contains less than 0.02 mol alkali metal per 100 g iron and the $H_2$:carbon oxide molar ratio in the feed of $H_2$ and carbon oxide is at least 2.

2. The process of claim 1, wherein the hydrocarbons produced contain at least 40% on a mass basis of $C_{5+}$ compounds.

3. The process of claim 1, wherein the temperature range for the HTFT hydrocarbon synthesis conditions is between 280° C. and 400° C.

4. The process of claim 1, wherein the process is carried out in a fluidized bed reactor.

5. The process of claim 1, wherein an alkali promoter for the alkali-promoted iron hydrocarbon synthesis catalyst is potassium oxide or sodium oxide.

6. The process of claim 1, wherein the reaction mixture formed during the conversion process contains less than 0.01 mol alkali metal per 100 g iron.

7. The process of claim 3, wherein the pressure for the HTFT hydrocarbon synthesis conditions is from 10 to 60 bar.

8. The process of claim 1, wherein the alkali-promoted iron hydrocarbon synthesis catalyst is a precipitated catalyst.

9. The process of claim 1, wherein the alkali-promoted hydrocarbon synthesis catalyst is a fused catalyst.

10. The process of claim 1, wherein the $H_2$:carbon oxide molar ratio is from 2 to 2.6.

* * * * *